Aug. 18, 1925.
J. G. TAYLOR ET AL
1,549,931
HAY LOADER
Filed June 18, 1924
2 Sheets-Sheet 1
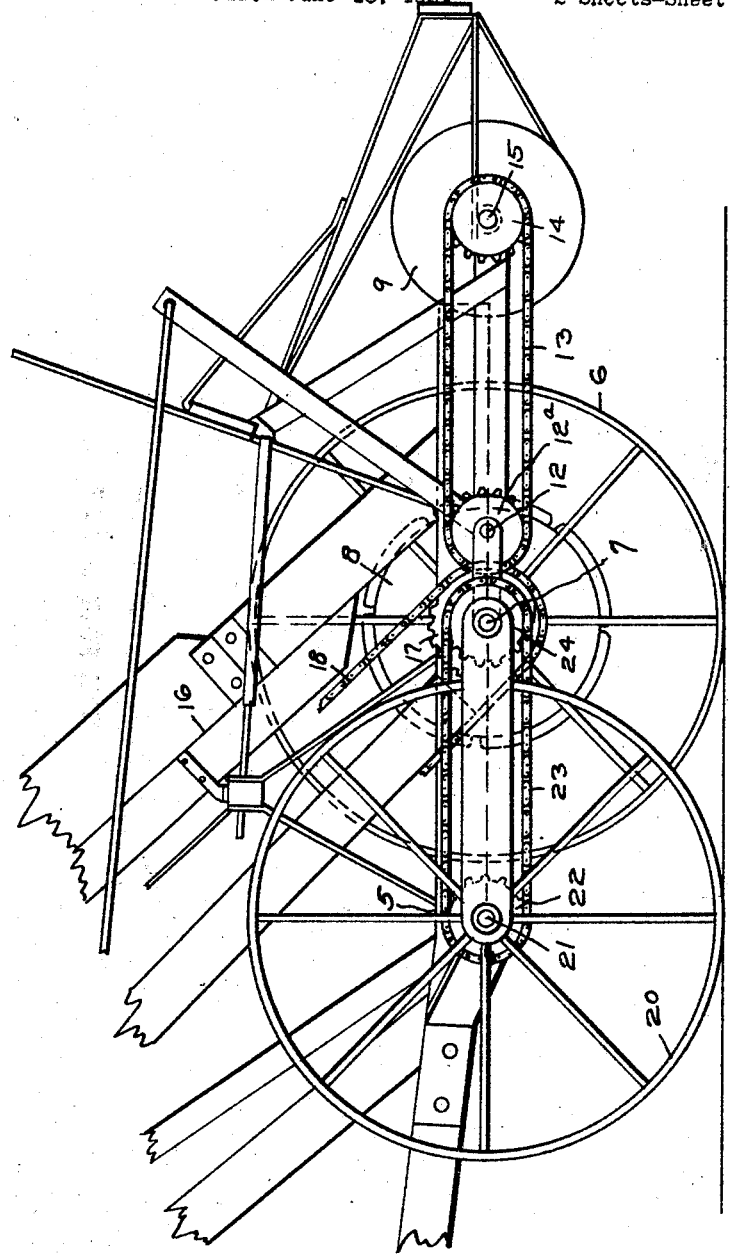
Inventor
John G. Taylor and
Hiram Stoker
By Samuel Herrick
Attorney

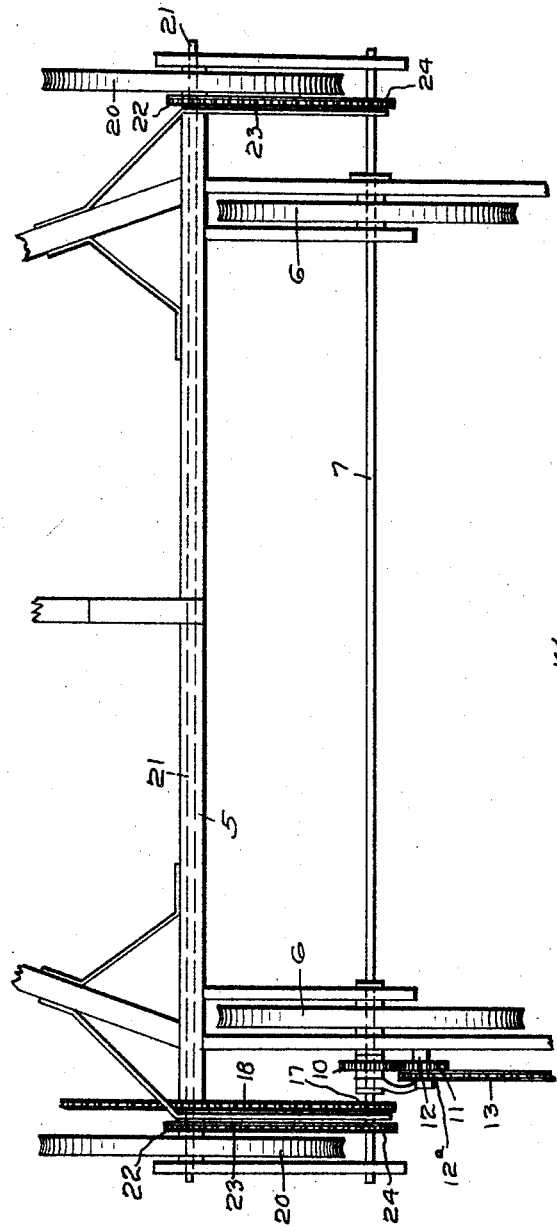

Patented Aug. 18, 1925.

1,549,931

UNITED STATES PATENT OFFICE.

JOHN G. TAYLOR AND HIRAM STOKER, OF LOVELOCK, NEVADA.

HAY LOADER.

Application filed June 18, 1924. Serial No. 720,848.

*To all whom it may concern:*

Be it known that JOHN G. TAYLOR and HIRAM STOKER, citizens of the United States, residing at Lovelock, in the county of Pershing and State of Nevada, have invented certain new and useful Improvements in Hay Loaders, of which the following is a specification.

This invention relates to hay loaders of the character of that shown in United States Patent 1,405,808 issued on Feb. 7, 1922, to John G. Taylor and Hiram Stoker.

In the hay loader of the patent aforesaid and in many other hay loaders in common use the rear part of the loader is supported by and carried on two wheels located on an axle or shaft, from which all of the moving parts are driven. When loading hay on land which has been irrigated by means of parallel furrows and when traveling with the furrows these wheels may drop into the furrows causing the cylinders of the hay loader to drag on the ground, or else bringing them so near to the ground surface that they cannot pick up the hay. Moreover, when traveling across the furrows the constant jolting interferes with the efficient operation of the machine; produces a severe strain on the entire structure and very greatly shortens the life of the hay loader. Consequently it is desirable to provide a structure which will maintain the hay loader at substantially the same level irrespective of its position with respect to the furrows or other inequalities of the ground.

Further objects and advantages of the invention will be set forth in the detailed description which follows:

In the accompanying drawing Fig. 1 is a side elevation illustrating the rear end of a hay loader like that shown in Patent 1,405,808 aforesaid, and Fig. 2 is a plan view of the structure illustrated in Fig. 1.

In the drawings 5 designates a supporting frame, which is mounted upon the usual ground wheels 6 through the medium of a shaft 7. This shaft carries a slatted cylinder 8 and drives to a second slatted cylinder 9, the means for driving said cylinder 9 comprising spur gears 10 and 11 the gear 10 being mounted upon shaft 7 and the gear 11 being mounted upon a counter shaft 12. This counter shaft carries a sprocket wheel 12$^a$ with which a sprocket chain 13 engages and this sprocket chain in turn drives to a sprocket wheel 14 upon the shaft 15 of the cylinder 9.

The shaft 7 also constitutes the driving means for the main elevator 16 and carries a sprocket wheel 17 over which a sprocket chain 18 passes. This sprocket chain 18 constitutes the drive for an upper laterally acting conveyor (not shown), but the laterally acting conveyor is disclosed in the Patent 1,405,808, and it forms no part of the invention, the present invention being intended to cover the auxiliary ground wheels hereinafter described. The special auxiliary wheels are indicated at 20 and are shown as being mounted upon a shaft 21 which is placed forward of and to the outside of the standard wheels and which auxiliary wheels take the load whenever the standard wheels are crossing or running in the irrigation furrows. The shaft 21 carries sprocket wheels 22 which drive by means of chains 23 to sprocket wheels 24 on the main shaft or axle 7. Thus the conveyor 16, both of the cylinders and the sprocket chain 18 will be driven whether it is the main ground wheels or the auxiliary wheels that are in engagement with the ground.

Other important features of the hay loader are shown in our co-pending applications Serial No. 720,847 and Serial No. 720,849 both filed on the 18th day of June 1924.

As before stated this particular application relates to the main and auxiliary ground wheels driving in common to the main mechanism of the loader. It is to be understood that the invention is not limited to the precise construction set forth but that it includes within its purview whatever changes fairly come within either the terms or the spirit of the appended claims.

Having described our invention what we claim is:

1. A hay loader comprising hay gathering and elevating means and two sets of ground wheels one in advance of the other, and means for driving the gathering and elevating mechanism from both sets of ground wheels.

2. The combination with a hay loader comprising an elevating means, of two sets of ground wheels one in advance of the other and out of alignment with each other and means for driving the elevating means from both sets of ground wheels.

3. The combination with a hay loader comprising an elevating conveyor and two sets of ground wheels disposed on two separate shafts, one located in advance of the other, said ground wheels being disposed out of alignment with each other; means for driving the conveyor from one set of ground wheels and driving connections between the two sets of ground wheels.

In testimony whereof they affix their signatures.

JOHN G. TAYLOR.
HIRAM STOKER.